United States Patent
Chen

(10) Patent No.: US 9,891,614 B2
(45) Date of Patent: *Feb. 13, 2018

(54) ONLINE REAL-TIME CONTROL METHOD FOR PRODUCT MANUFACTURING PROCESS

(71) Applicant: Shenzhen China Star Optoelectronics Technology Co., Ltd., Shenzhen, Guangdong (CN)

(72) Inventor: Lixuan Chen, Guangdong (CN)

(73) Assignee: Shenzhen China Star Optoelectronics Technology Co., Ltd, Shenzhen, Guangdong (CN)

(*) Notice: Subject to any disclaimer, the term of this patent is extended or adjusted under 35 U.S.C. 154(b) by 224 days.

This patent is subject to a terminal disclaimer.

(21) Appl. No.: 14/779,698

(22) PCT Filed: Mar. 10, 2015

(86) PCT No.: PCT/CN2015/073951
§ 371 (c)(1),
(2) Date: Sep. 24, 2015

(87) PCT Pub. No.: WO2016/138674
PCT Pub. Date: Sep. 9, 2016

(65) Prior Publication Data
US 2016/0378094 A1    Dec. 29, 2016

(30) Foreign Application Priority Data
Mar. 3, 2015  (CN) .......................... 2015 1 0095593

(51) Int. Cl.
G05B 19/406      (2006.01)
G05B 19/418      (2006.01)

(52) U.S. Cl.
CPC ..... *G05B 19/406* (2013.01); *G05B 19/41875* (2013.01); *G05B 2219/32182* (2013.01);
(Continued)

(58) Field of Classification Search
CPC ................ G05B 19/406; G05B 19/418; G05B 2219/32368; Y02P 90/22; Y02P 90/02
See application file for complete search history.

(56) References Cited

U.S. PATENT DOCUMENTS 5,404,388 A * 4/1995 Eu .......................... G01R 19/25
                                                        379/24
5,971,584 A * 10/1999 Iriuchijima ...... G05B 19/41865
                                                        700/100

(Continued)

*Primary Examiner* — Ramesh Patel
(74) *Attorney, Agent, or Firm* — Andrew C. Cheng

(57) ABSTRACT

The invention provides an online real-time control method for a product manufacturing process and includes: (A) establishing a monitoring equation for estimating a product attribute in view of production line parameters corresponding to respective steps in a manufacturing process of a product; (B) when each of the steps is finished, updating the calculation result according to an online feedback value(s) of the production line parameter(s) corresponding to the finished step; (C) when the updated calculation result in the step (B) indicates that the quality of the product does not meet a required quality specification, adjusting the production line parameter(s) corresponding to the step(s) after the finished step to make the quality of the product meet the required quality specification. According to the method, a key attribute(s) of the display device can be kept within an acceptable specification by adjusting the production line parameter(s) of subsequent step(s).

15 Claims, 1 Drawing Sheet

(52) U.S. Cl.
CPC ..... *G05B 2219/32368* (2013.01); *Y02P 90/02* (2015.11); *Y02P 90/22* (2015.11)

(56) References Cited

U.S. PATENT DOCUMENTS

| | | | | |
|---|---|---|---|---|
| 6,720,194 | B1* | 4/2004 | Miller | H01L 22/20 257/E21.525 |
| 7,219,068 | B2* | 5/2007 | Zelek | G06Q 30/0201 700/97 |
| 8,078,433 | B2* | 12/2011 | Klippel | G06F 17/5036 327/560 |
| 2003/0040954 | A1* | 2/2003 | Zelek | G06Q 30/0201 705/7.29 |
| 2005/0085032 | A1* | 4/2005 | Aghababazadeh | G01R 31/2831 438/232 |
| 2006/0060768 | A1* | 3/2006 | Kaufman | H01J 49/42 250/281 |
| 2008/0189087 | A1* | 8/2008 | Klippel | H04R 3/002 703/2 |

\* cited by examiner

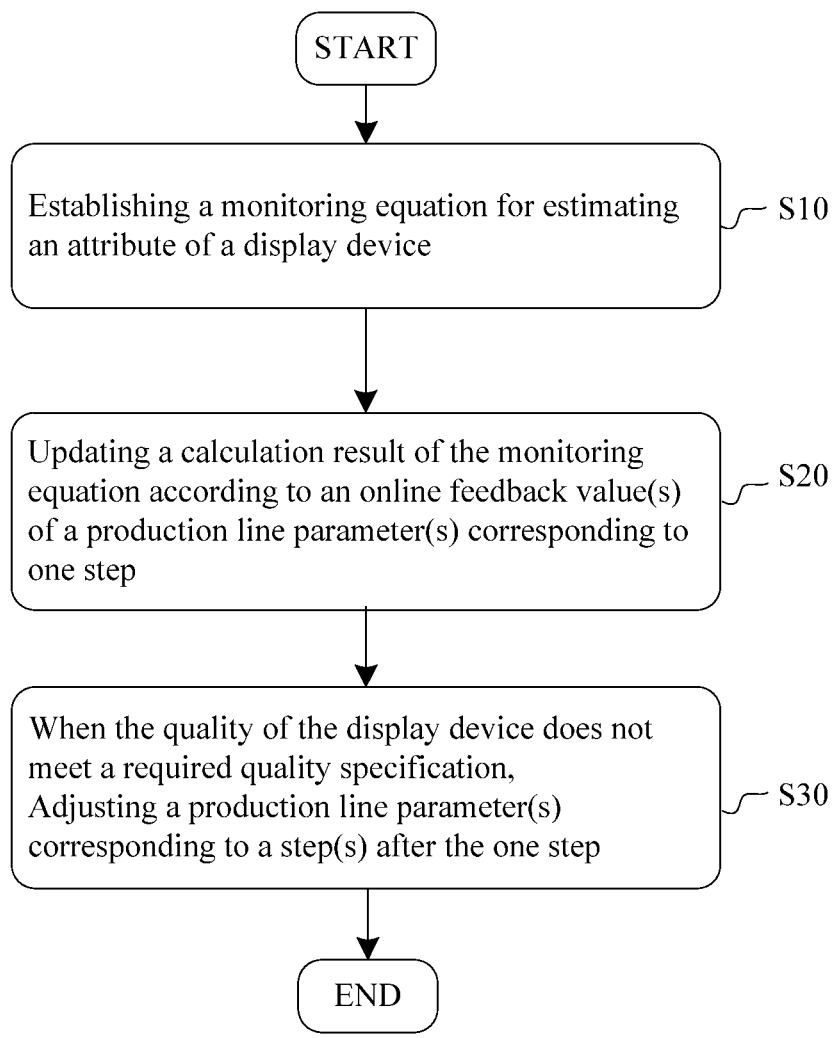

ONLINE REAL-TIME CONTROL METHOD FOR PRODUCT MANUFACTURING PROCESS

TECHNICAL FIELD

The invention generally relates to the manufacturing of display device, specifically relates to an online real-time control method for a manufacturing process of a display device. Furthermore, the method also is adapted for a manufacturing process of product with many manufacturing steps and complicated process.

DESCRIPTION OF RELATED ART

In the market of display devices with more brands, the quality of display device is one of important factors in determining market share, owing to a production process of a display device includes several manufacturing processes, if a certain step of the manufacturing process has a large fluctuation, a phenomenon of a key attribute(s) of a display device being beyond specification limit(s) would be occurred, it means that the quality of the display device could not meet the quality specification.

For example, Gamma is one of important factors affecting the quality of a liquid crystal display device, which stems from a response curve of the display device and represents a non-linear relationship between a display brightness and an input voltage of the display device. Production line parameters corresponding to certain steps of a manufacturing process of the liquid crystal display device are associated with the Gamma attribute, if production line parameters corresponding to a certain step have a large fluctuation, it would make the Gamma attribute be beyond a specification limit, that is, the quality of the liquid crystal display device does not meet a required quality specification.

In the conventional manufacturing process of display device, even if a quality-unqualified product caused by the manufacturing process fluctuation in a production line is discovered in a timely manner, there is no way to retrieve/remedy the semi-finished product which has been produced to a half.

SUMMARY

Exemplary embodiments of the invention are to provide an online real-time control method for a product manufacturing process, especially for a manufacturing process of a display device, so as to overcome the problem that the quality-unqualified semi-finished product is difficult to be remedied in the prior art.

An embodiment of the invention provides an online real-time control method for a product manufacturing process, and the method includes: (A) establishing a monitoring equation for estimating a product attribute in view of production line parameters corresponding to respective steps in a manufacturing process of a product, wherein a calculation result of the monitoring equation is used to indicate a quality of the product, the monitoring equation is expressed as a nonlinear function relationship with the production line parameters, and a specific nonlinear function is determined by a least square method; (B) when each of the steps of the product is finished, updating the calculation result of the monitoring equation according to an online feedback value(s) of the production line parameter(s) corresponding to the finished step; (C) when the updated calculation result in the step (B) indicates that the quality of the product does not meet a required quality specification, adjusting the production line parameter(s) corresponding to a step(s) after the finished step to thereby make the quality of the product meet the required quality specification; the monitoring equation is expressed as the following formula:

$$S = f(X_1, X_2, X_3, \ldots X_i \ldots, X_n)$$

where S is the product attribute, $X_i$ comprises all production line parameter(s) corresponding to an i-th step in the manufacturing process of the product, n is the number of the steps included in the manufacturing process of the product.

In one embodiment, the monitoring equation is expressed as a nonlinear function of weighting the production line parameters, and the monitoring equation is expressed as the following formula:

$$S = \sum_{i=1}^{n} f_i(X_i),$$

where S is the product attribute, $X_i$ comprises all production line parameter(s) corresponding to an i-th step in the manufacturing process of the product, $f_i$ is a nonlinear function corresponding to $X_i$, n is the number of the steps included in the manufacturing process of the product.

In one embodiment, the nonlinear function is a power function, a logarithmic function or a polynomial function.

In one embodiment, the method is used for a production manufacturing process of a display device, the product is a liquid crystal display devices or an organic electroluminescent display device.

In one embodiment, the product attributes comprise at least one of the following items: Gamma attribute, contrast attribute and penetration rate attribute.

In one embodiment, the product is a liquid crystal display device, and the product attribute comprises Gamma attribute, and the steps in the manufacturing process of the product comprise a PI step, a ITO step, a cell gap step, a HVA step and a LC step; the production line parameter corresponding to the PI step comprises thickness and temperature; the production line parameter corresponding to the ITO step comprises crack and thickness; the production line parameter corresponding to the cell gap step comprises distance; the production line parameter corresponding to the HVA step comprises voltage, temperature, time and illumination; the production line parameter corresponding to the LC step comprises quantity.

In one embodiment, in the step (B), for the production line parameter(s) corresponding to the step(s) after the finished step, a preset standard value(s) thereof is/are used to updating the calculation result of the monitoring equation.

In one embodiment, in the step (C), the production line parameter(s) corresponding to the step(s) after the finished step is/are manually adjusted according to a predetermined adjustment range(s) of the respective production line parameter(s) corresponding to the step(s) after the finish step.

In an online real-time control method for a manufacturing process of a display device according to exemplary embodiments of the invention, a key attribute(s) of the display device can be kept within an acceptable specification by adjusting the production line parameter corresponding to the subsequent step(s) to thereby retrieve an irremediable situation that the quality problem occurred by the semi-finished product is difficult to be remedied, improve a product yield of a qualified display device and reduce costs. Owing to a complex physical mechanism and many manufacturing steps of the display device, so that the monitoring equation uses a nonlinear function relationship, a nonlinear fitting system could better meet an actual situation so as to improve a monitoring accuracy.

BRIEF DESCRIPTION OF THE DRAWINGS

FIG. 1 shows a flowchart of an online real-time control method for a manufacturing process of a display device according to an exemplary embodiment of the invention.

DETAILED DESCRIPTION OF EMBODIMENTS

As mentioned above, an objective of the invention is to provide an online real-time control method for a product manufacturing process so as to overcome a problem that the quality-unqualified semi-finished product is difficult to be remedied in the prior art. The method includes: (A) establishing a monitoring equation for estimating a product attribute in view of production line parameters corresponding to respective steps in a manufacturing process of a product, wherein a calculation result of the monitoring equation is used to indicate a quality of the product, the monitoring equation is expressed as a nonlinear function relationship with the production line parameters, and a specific nonlinear function is determined by a least square method; (B) when each of the steps in the manufacturing process of the product is finished, updating the calculation result of the monitoring equation according to an online feedback value(s) of the production line parameter(s) corresponding to the finished step; (C) when the updated calculation result in the step (B) indicates that the quality of the product does not meet a required quality specification, adjusting the production line parameter(s) corresponding to the step(s) after the finished step to thereby make the quality of the product meet the required quality specification.

For a product with complex manufacturing process, it includes multiple (i.e., more than one) manufacturing steps, if monitoring that a product attribute does not meet a required quality specification after a previous step is finished, by means of adjusting a production line parameter(s) of a subsequent step(s) to keep the product attribute be within an acceptable specification, it can avoid an irremediable situation caused by the quality problem of semi-finished product, improve the yield of qualified product and reduce the cost.

An exemplary embodiment of the invention now will be referred in detail, an example of the exemplary embodiment is illustrated with reference to the accompanying drawing, and same numerals always refer to same parts. The following description will take a manufacturing process of a display device as an example to illustrate the embodiment with reference to the accompanying drawing so as to explain the invention.

FIG. 1 shows a flowchart of an online real-time control method for a manufacturing process of a display device according to an exemplary embodiment of the invention. Herein, as an example, the display device may be a liquid crystal display (LCD) device or an organic electroluminescent (EL) display device. It is understood that the display device is not limited to the liquid crystal display device or the organic electroluminescent display device, and can be other display device.

Referring to FIG. 1, in the step S10, establishing a monitoring equation for estimating an attribute of a display device. The monitoring equation for estimating the attribute of the display device is established based on production line parameters corresponding to respective steps in a manufacturing process of the display device, and a calculation result of the monitoring equation is used to indicate a quality of the display device.

Herein, in an actual production, a drift of the attribute of the display device will seriously affect the quality of the display device, and production line parameters respectively corresponding to the respective steps in a manufacturing process of the display device will affect the attribute of the display device, therefore establishing a monitoring equation for estimating attribute of the display device based on production line parameters respectively corresponding to the respective steps in a manufacturing process of the display device. As an example, the attribute of the display device may be include at least one of the following items: Gamma attribute, contrast attribute and penetration rate attribute. The Gamma attribute can represent a non-linear relationship between a display brightness and an input voltage of the display device; the contrast attribute can represent a ratio of a brightness of the display device; the penetration rate attribute can represent a transmittance of the display device. The monitoring equation can represent a nonlinear function relationship with the production line parameters, and a specific nonlinear function is determined by a least square method.

Concretely, the monitoring equation represents a nonlinear function of weighting the production line parameters. For instance, using the following formula 1 to show the monitoring equation:

$$S = \sum_{i=1}^{n} f_i(X_i) \qquad \text{(formula 1)}$$

where S represents the attribute of the display device, $X_i$ includes all production line parameter(s) corresponding to an i-th step in a manufacturing process of the display device, $f_i$ represents a nonlinear function corresponding to $X_i$ which could be a power function, a logarithmic function or a polynomial function, n represents the number of the steps included in the manufacturing process of the product. Herein, as an example, $X_i$ could be multiple production line parameters corresponding to the i-th step in a manufacturing process of the display device, such as the i-th step includes two production line parameters $X_{i1}$ and $X_{i2}$ and the formula 1 above-mentioned correspondingly includes $f_{i1}(X_{i1})$ and $f_{i2}(X_{i2})$.

For instance, the display device is a liquid crystal display device, the attribute of the display device is Gamma attribute, the steps in the manufacturing process of the display device include a PI (Polyimide) step, a ITO (Indium Tin Oxide) step, a cell gap step, a HVA (High Vertical Alignment) step and a LC (Liquid Crystal) step. The production line parameter corresponding to the PI step includes thickness and temperature; the production line parameter corresponding to the ITO step includes crack and thickness; the production line parameter corresponding to the cell gap step includes distance; the production line parameter corresponding to the HVA step includes voltage, temperature, time and illumination; the production line parameters corresponding to the LC step includes quantity.

Correspondingly, in view of the above-mentioned production line parameters online monitored and a standard Gamma value, the nonlinear function corresponding to respective production line parameters is determined by use of the least square method so as to obtain the monitoring equation used to estimate the Gamma attribute.

Using the following formula 2 to show the monitoring equation used to estimate the Gamma attribute:

$$S=f_{11}(X_{11})+f_{12}(X_{12})+f_{21}(X_{21})+f_{22}(X_{22})+f_3(X_3)+ \\ f_{41}(X_{41})+f_{42}(X_{42})+f_{43}(X_{43})+f_{44}(X_{44})+f_5(X_5) \quad \text{(formula 2)}$$

S represents the Gamma attribute of the liquid crystal display device, $X_{11}$ and $X_{12}$ respectively represent a thickness production line parameter and a temperature production line parameter corresponding to the PI step, $f_{11}(X_{11})$ and $f_{12}(X_{12})$ respectively represent a nonlinear function corresponding to the thickness production line parameter $X_{11}$ and a nonlinear function corresponding to the temperature production line parameter $X_{12}$, $X_{21}$ and $X_{22}$ respectively represent a crack production line parameter and a thickness production line parameter corresponding to the ITO step, $f_{21}(X_{21})$ and $f_{22}(X_{22})$ respectively represent a nonlinear function corresponding to the crack production line parameter $X_{21}$ and a nonlinear function corresponding to the thickness production line parameter $X_{22}$, $X_3$ represents a distance production line parameter corresponding to the cell gap step, $f_3(X_3)$ represents a nonlinear function corresponding to the distance production line parameter $X_3$, and $X_{41}$, $X_{42}$, $X_{43}$ and $X_{44}$ respectively represent a voltage production line parameter, a temperature production line parameter, a time production line parameter and an illumination production line parameter, $f_{41}(X_{41})$, $f_{42}(X_{42})$, $f_{43}(X_{43})$ and $f_{44}(X_{44})$ respectively represent a nonlinear function corresponding to the voltage production line parameter $X_{41}$, a nonlinear function corresponding to the temperature production line parameter $X_{42}$, a nonlinear function corresponding to the time production line parameter $X_{43}$ and a nonlinear function corresponding to the illumination parameter $X_{44}$, $X_5$ represents a quantity production line parameter corresponding to the LC step, $f_5(X_5)$ represent a nonlinear function corresponding to the quantity production line parameter $X_5$.

In the step S20, when each of the steps of the product is finished, updating the calculation result of the monitoring equation according to an online feedback value(s) of the production line parameter(s) corresponding to the finished step.

Concretely, a manufacturing process of the display device may include multiple steps, and the multiple steps have a predetermined order, when a step of the display devices is finished, the online feedback value of the production line parameter corresponding to the step would be updated, and the updated value of the production line parameter corresponding to the step are substituted into the monitoring equation so as to obtain a adjusted calculation result. Herein, it is noticed that a default standard value is substituted into the monitoring equation for the step(s) being not passed. That is, for the production line parameter(s) corresponding to the step(s) located after the finished step, predetermined standard value(s) are respectively used to update the calculation result of the monitoring equation.

In the step S30, when the updated calculation result in the step (B) indicates that the quality of the display device does not meet a required quality specification, adjusting the production line parameter(s) corresponding to a step(s) corresponding to a step(s) located after the finished step so as to make the quality of the display device meet the required quality specification.

Specifically, when the updated calculation result in the step (B) indicates that the quality of the display device does not meet the required quality specification, the completed step could be determined when the quality of the display device do not meet the required quality specification. For instance, when a updated calculation result of the Gamma attribute of the display device after the cell gap step is finished exceeds the quality specification (e.g., Gamma=2.3), the production line parameter corresponding to a next step (that is, a step located after the cell gap step) could be adjusted to make the quality of the display device meet the required quality specification (e.g., Gamma=2.2). Herein, for an example, the production line parameter corresponding to the step(s) located after the finished step is/are manually adjusted according to a predetermined adjustment range(s) of the respective production line parameter(s) respectively corresponding to the step(s) after the finished step. Through the above treatment, the production line parameter of a following step could be adjusted to keep the key attribute(s) of the display device within an acceptable specification so as to retrieve/remedy the half-finished product.

For an adjustment of the production line parameters corresponding to the step(s) after the finished step, it should comply with an adjustment scope required by the product. If an assessment result is adjusting the subsequent production line parameter(s), and the attribute exceeded the specification could be adjusted to the required scope, then an adjusted value would be reported to the later section(s) to accordingly adjust the later section(s); if the assessment result is adjusting the subsequent production line parameter(s), and the attribute exceeded the specification still could not be adjusted to the required scope (fluctuation too severe), so that revision parameter(s) would be given up and a risk of management and control of this batch of the product would be reported to the later section(s).

In the above-mentioned embodiments, owing to a complex physical mechanism and more manufacturing steps of the display device, the monitoring equation uses a nonlinear function relationship, a nonlinear fitting system could better meet an actual situation so as to improve a monitoring accuracy. In the above-mentioned embodiments, the monitoring equation (formula 1, formula 2) represent a linear superposition of nonlinear results of each of the production line parameter(s). In other embodiments, each of the production line parameter(s) could be directly associated with the results shown the attribute(s) of the product by the nonlinear relationship. For instance, in the other embodiments, the following formula 3 is used to represent the monitoring equation:

$$S=f(X_1,X_2,X_3,\ldots X_i \ldots ,X_n) \quad \text{(formula 3)}$$

Where S represents the product attribute, $X_i$ includes all production line parameter(s) corresponding to the i-th step in the manufacturing process of the products In the formula 3, each of the production line parameters $(X_1, X_2, X_3, \ldots X_i \ldots , X_n)$ is directly associated with the result shown the product attribute (S) by the nonlinear relationship. The nonlinear relationship could be a power function, a logarithmic function or a polynomial function.

Therefore, it can be seen that: in the online real-time control method for a manufacturing process of the display device provided by the above-mentioned embodiments, the subsequent production line parameter(s) could be adjusted to keep a key attribute(s) of the display device within an acceptable specification so as to avoid an irremediable situation owing to quality problems of the semi-finished product, improve the yield of the qualified display device and reduce the costs.

Although the invention has been shown and described with reference to multiple exemplary embodiments, it should be understood for the skill in the art that without departing from the spirit and scope of the invention defined by claims and equivalents, the multiple exemplary embodiments could be modified.

What is claimed is:

1. An online real-time control method for a manufacturing process of a display device manufactured by a plurality of steps, the method comprising:
   (A) establishing an equation for estimating an attribute of the display device in view of parameters corresponding to the respective steps, wherein a calculation result of the equation is used to indicate a quality of the display device associated with the attribute, the equation is expressed as a nonlinear function relationship with the parameters, and a specific nonlinear function is determined by a least square method;
   (B) when each of the steps of the display device is finished, updating the calculation result of the equation according to an online feedback value(s) of the parameter(s) corresponding to the finished step;
   (C) when the updated calculation result in the step (B) indicates that the quality of the display device does not meet a required quality specification, adjusting the parameter(s) corresponding to a subsequent step(s) after the finished step;
   (D) obtaining the display device finally manufactured by the steps and with a quality meet the required quality specification, after adjusting the parameter(s) corresponding to a subsequent step(s) after the finished step.

2. The method as claimed in claim 1, wherein the equation is expressed as a nonlinear function of weighting the parameters, and the equation is expressed as the following formula:

$$S = \sum_{i=1}^{n} f_i(X_i),$$

where S is the attribute, $X_i$ comprises all parameter(s) corresponding to an i-th step in the manufacturing process of the display device, $f_i$ is a nonlinear function corresponding to $X_i$, n is the number of the steps included in the manufacturing process of the display device.

3. The method as claimed in claim 2, wherein the nonlinear function is a power function, a logarithmic function or a polynomial function.

4. The method as claimed in claim 2, the display device is a liquid crystal display device or an organic electroluminescent display device.

5. The method as claimed in claim 4, wherein the attribute comprises at least one of the following items: Gamma attribute, contrast attribute and transmittance attribute.

6. The method as claimed in claim 2, wherein the display device is a liquid crystal display device, and the attribute is Gamma attribute, and the steps in the manufacturing process of the display device comprise a PI step, a ITO step, a cell gap step, a HVA step and a LC step; the parameter corresponding to the PI step comprises thickness and temperature; the parameter corresponding to the ITO step comprises crack and thickness; the parameter corresponding to the cell gap step comprises distance; the parameter corresponding to the HVA step comprises voltage, temperature, time and illumination; the parameter corresponding to the LC step comprises quantity.

7. The method as claimed in claim 2, wherein, in the step (B), for the parameter(s) corresponding to the subsequent step(s) after the finished step, a preset standard value(s) thereof is/are used to update the calculation result of the equation.

8. The method as claimed in claim 2, wherein, in the step (C), the parameter(s) corresponding to the subsequent step(s) after the finished step is/are manually adjusted according to a predetermined adjustment range(s) of the respective parameter(s) corresponding to the subsequent step(s) after the finished step.

9. An online real-time control method for a manufacturing process of a display device manufactured by a plurality of steps, the method comprising:
   (A) establishing an equation for estimating an attribute of the display device in view of parameters corresponding to the respective steps, wherein a calculation result of the equation is used to indicate a quality of the display device associated with the attribute, the equation is expressed as a nonlinear function relationship with the parameters, and a specific nonlinear function is determined by a least square method;
   (B) when each of the steps of the display device is finished, updating the calculation result of the equation according to an online feedback value(s) of the parameter(s) corresponding to the finished step;
   (C) when the updated calculation result in the step (B) indicates that the quality of the display device does not meet a required quality specification, adjusting the line parameter(s) corresponding to a subsequent step(s) after the finished step;
   (D) obtaining the display device finally manufactured by the steps and with a quality meet the required quality specification, after adjusting the parameter(s) corresponding to a subsequent step(s) after the finished step;
   wherein the equation is expressed as the following formula:

$$S = f(X_1, X_2, X_3, \ldots, X_n)$$

where S is the attribute, $X_i$ comprises all parameter(s) corresponding to an i-th step in the manufacturing process of the display device, n is the quantity of the steps included in the manufacturing process of the display device.

10. The method as claimed in claim 9, wherein the nonlinear function is a power function, a logarithmic function or a polynomial function.

11. The method as claimed in claim 9, wherein the display device is a liquid crystal display device or an organic electroluminescent display device.

12. The method as claimed in claim 11, wherein the attribute comprise at least one of the following items: Gamma attribute, contrast attribute and transmittance attribute.

13. The method as claimed in claim 9, wherein the display device is a liquid crystal display device, and the attribute is Gamma attribute, and the steps in the manufacturing process of the display device comprise a PI step, a ITO step, a cell gap step, a HVA step and a LC step; the parameter corresponding to the PI step comprises thickness and temperature; the parameter corresponding to the ITO step comprises crack and thickness; the parameter corresponding to the cell gap step comprises distance; the parameter corresponding to the HVA step comprises voltage, temperature, time and illumination; the parameter corresponding to the LC step comprises quantity.

14. The method as claimed in claim 9, wherein, in the step (B), for the parameter(s) corresponding to the subsequent step(s) after the finished step, a preset standard value(s) thereof is/are used to update the calculation result of the equation.

15. The method as claimed in claim 9, wherein, in the step (C), the parameter(s) corresponding to the subsequent step(s) after the finished step is/are manually adjusted according to a predetermined adjustment range(s) of the respective parameter(s) corresponding to the subsequent step(s) after the finished step.

\* \* \* \* \*